Dec. 26, 1961 T. W. DICKINSON 3,014,768
BEARING SEAL
Filed July 7, 1958

INVENTOR
THORN W. DICKINSON
BY
*Mitchell Bechert*
ATTORNEYS (## United States Patent Office)

3,014,768
Patented Dec. 26, 1961

3,014,768
BEARING SEAL
Thorn W. Dickinson, New Britain, Conn., assignor to
The Fafnir Bearing Company, New Britain, Conn., a
corporation of Connecticut
Filed July 7, 1958, Ser. No. 746,762
6 Claims. (Cl. 308—187.2)

My invention relates to a bearing seal and more particularly to improved means for sealing a bearing and mounting such as automotive rear wheel and gear case applications.

In sealing a bearing mounting it is now usual to provide a separate and independent seal between the bearing and the mounting support such as a shoulder in the bore in which the bearing fits. That method requires the use of two independent members and machining for both the bearing and the seal.

It is an object of my invention to provide an improved type of seal normally unitarily carried by the bearing, which seal is adapted to seal the bearing itself and seal the bearing mounting upon insertion of the bearing and seal into final position.

Another object is to provide a bearing seal which is piloted on the inner ring and which floats in the outer ring and does not form a complete seal until compressed against a shoulder in the outer ring and against an abutment of a bearing mounting.

A further object is to provide a seal unitarily carried with the bearing and usually interposed between the two bearing rings and normally positioned so as to be compressed between a part of the outer ring and a bearing housing to form a complete seal for the bearing and between the bearing and the housing.

It is another object to provide an improved bearing seal which is at all times piloted on the inner ring and which may float in the outer ring and be held in sealing and piloted positions by compression axially between a shoulder of the outer ring and an abutment or part of a bearing mounting.

Another object is to provide an improved bearing seal piloted on the inner ring and which requires no accurate machining or grinding of the outer ring to form a tight seal and which facilitates mounting in and sealing of a bearing mounting.

Other objects and various features of novelty and invention will be hereinafter pointed out or will become apparent to those skilled in the art.

Briefly stated, in a preferred form of the invention, my improved seal is used with antifriction bearings, such as a ball bearing, involving inner and outer bearing rings with interposed antifriction bearing members, such as balls. The bearing will be mounted in a support and usually in a bore therein, which bore will be in the nature of a counterbore and have an annular shoulder at the bottom. The bearing seal has a circumferentially extending part, preferably of resilient material fitting over the inner ring and serving to pilot the entire seal on the inner ring and being in running sealing relation therewith. The seal, if not formed of resilient material, preferably has resilient surfaces for engagement by a generally radial surface on the outer ring and a generally radial surface such as a shoulder or bottom of the counterbore heretofore referred to, in the bore of the housing or mounting.

Preferably, the seal extends across the space between the two rings, and is housed between those rings and carried thereby. The seal pilots on the inner ring, as heretofore noted, and floats in the outer ring. The outer ring may have a groove therein for receiving the seal and there is a shoulder at the bottom to be engaged axially by the seal. If desired, the groove in the outer ring may have a shoulder or surface of other configuration for loosely retaining the seal in the space between the two rings to prevent accidental loss of the seal from the bearing.

The seal at its radially outer portion is designed to be compressed between the radial surface or shoulder of the outer ring and the shoulder or abutment in the support or mounting for the bearing. This compression of the seal while it is piloted on the inner ring serves to hold the seal in proper position without losing its pilot and serves to compress the seal into tight sealing engagement with the shoulder or radial surface of the outer ring and the shoulder or radial type of abutment in the bearing support. Thus when the bearing is in place and the seal compressed, the seal will serve to seal against leakage past the inner ring and past the outer ring and past the housing shoulder. The bearing itself will be completely sealed and the bearing will be completely sealed in its mounting.

In the preferred form, the seal at its outer portion is of a width to extend beyond the adjacent end of the outer ring so that the shoulder or radial abutment in the housing or mounting may serve as an abutment for the adjacent edge of the outer ring and also as an abutment against which the seal is compressed. The seal and its arrangement may take various forms.

In the drawings, which show for illustrative purposes only preferred forms of the invention:

Figure 1:
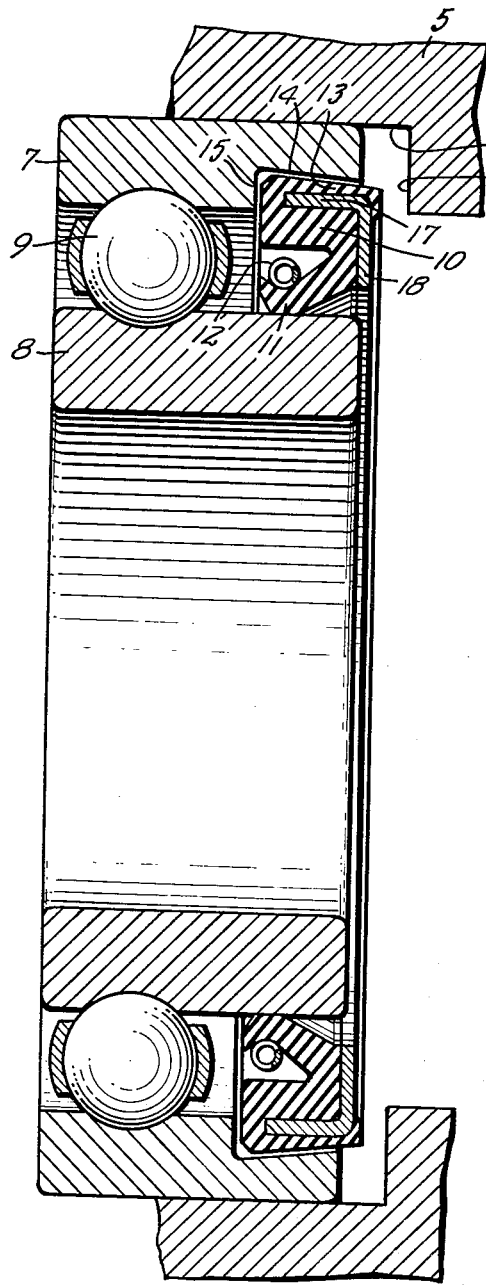
FIG. 1 is a central diametral section through a bearing and seal, a housing or mounting for the bearing being fragmentarily shown.

In said drawings, there is fragmentarily shown a bearing mounting 5 having a bore 6 therein for receiving the outer ring 7 of an antifriction bearing, comprising the outer ring 7 and inner ring 8 with interposed antifriction bearing members, such as balls 9. A seal member is designed to seal the space between the two rings, and also to completely seal the housing against passage of oil or the like around the bearing. The seal is designed to be compressed between a radial surface or abutment on the outer ring and a radial surface or abutment on the housing.

In the preferred form, the seal 10 is interposed between the inner and outer rings 7—8. The seal may be composed of elastic material, such as rubber, artificial rubber, or the like, or at least may have resilient surfaces for engagement by various parts, as will be described. The seal 10 has an inner lip 11 surrounding the inner ring and in running sealing relationship therewith and serving to pilot the entire seal on the inner ring. If desired, a garter spring 12 may surround the lip 11 to improve contact between the ring and the lip. The seal 10 before being finally sealed into place floats in the outer ring and is simply piloted on the inner ring. As illustrated in FIG. 1 the outer surface of the seal is of generally conical shape with the small end of the cone extending toward the end of the ring, as indicated at 13. The ring itself has a corresponding conical groove 14 therein and the particular shape of the seal and groove are for the purpose of preventing accidental loss of the seal from the space between the rings.

The outer ring 7 has a radially extending surface or shoulder 15 at the bottom of the groove 14, and the housing 5 has a radially extending surface or shoulder 16 at the bottom of the bore 6. This shoulder 16 is designed to abut the end of the seal 10, and in the form shown, the seal 10 is of such axial length or size as to normally project beyond the end of the ring 7, as shown in FIG. 1. Thus, when the bearing and seal are moved toward the right before the outer ring 7 abuts the shoulder 16, the shoulder 16 will have abutted the end of the seal 10 and will be in seal-tight engagement therewith while the opposite axial end of the seal will be in seal-tight engagement with the shoulder 15 in the outer ring. The surfaces of the seal in engagement with the shoulders 15—16 are of resilient material, as indicated.

The seal itself may be formed completely of resilient material such as rubber or the like, or it may have a stiffening part or insert which may be in the form of a sleeve-like insert 17 in the direct line between the shoulders 15 and 16 in order that the adjacent ends of the seal will be fully compressed into sealing contact with the shoulders 15—16. This reinforcement or insert may include a generally radial plate 18 so that the entire insert or stiffener may be said to be in the form of a cup, the cylindrical insert 17 constituting the side of the cup and the radial plate 18 constituting the bottom.

As shown in FIG. 1, the seal simply floats in the outer ring and is piloted on the inner ring and the seal at the radially outer portion is not compressed. In the positions shown in FIG. 2, the seal is still piloted on the inner ring but the ends of the radially outer portion of the seal are compressed so as to hold or lock the seal in its proper piloted position and to form the seals between the inner and outer rings and seal and between the outer ring and the housing, as heretofore described. The seal itself may be manufactured and sold as an article of commerce, but it is preferred to have the seal assembled with the bearing and to sell the same as such a unit. In that way there is no danger of having a workman omit the seal where required because the seal is already in place.

Figure 2:
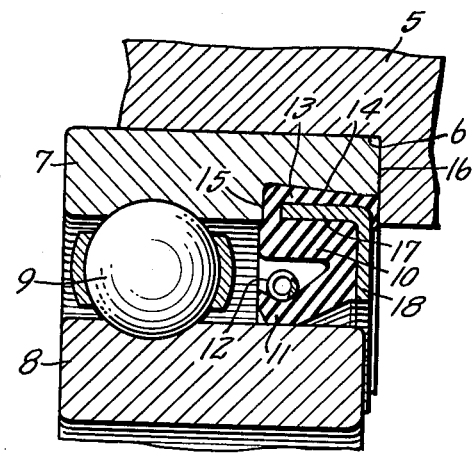
FIG. 2 is a fragmentary view similar to FIG. 1, but showing the bearing fully advanced in its bore so as to completely seal the bore as well as seal the bearing.

As shown in FIGS. 1 and 2, the seal is floating in the outer ring and is held against accidental displacement by the conical shape of the groove 14 and the outer form 15 of the seal.

Figure 3:
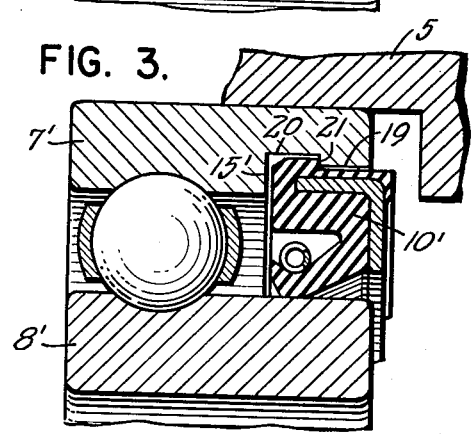
FIG. 3 is a fragmentary view similar to FIG. 1, but illustrating a slightly modified groove in the outer ring and modified shape of seal.

In FIG. 3, the outer ring 7' has a groove, but that groove is formed of cylindrical parts such as 19—20 leaving an axially inwardly facing shoulder 21 to engage a corresponding shoulder on the outer surface of the seal 10'. The shoulder 15' at the bottom of the groove is of the same form and serves the same purpose as the shoulder 15 heretofore described. The only essential difference between the forms shown in FIGS. 1 and 3 is in the shape of the groove and the shape of the outer portion of the seal, both forms being shaped to maintain the seal against accidental displacement from the rings.

Figure 4:
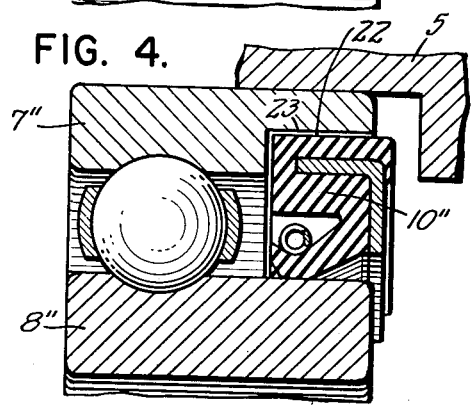
FIG. 4 is a view similar to FIG. 1, but illustrating a cylindrical bearing groove and a cylindrical outer surface on the seal.

In the form shown in FIG. 4, the outer ring 7" has a cylindrical groove 21 and the outer surface 22 of the seal 10" is also cylindrical so there is no outer part of the seal or the groove arranged to prevent accidental loss of the seal from the outer ring. However, the seal is designed to be held in place by the friction between the inner ring 8" and the seal lip.

The seal is designed to be compressed between a radial surface on the outer ring and a radial surface on a support or bearing mounting, and in all forms here illustrated, the seal projects beyond the end of the outer ring and is held in the space between the two rings, and the radial surface on the outer ring engaged by the seal is in the form of a shoulder at the bottom of the ring groove.

It will be seen that in all forms, no accurate finishing of the inner surface of the outer ring or the housing will be required. The seal simply floats in the outer ring and the resilient outer portion is compressed between the outer ring and the housing for the bearing. Because of the resilient seal surfaces a tight seal joint will be made with the outer ring and mounting or housing. The improved unitary and bearing seal makes for inexpensive preparation of the bore of the housing or mounting since no accurately finished surfaces need be provided. The shaft also needs no special preparation. The cost of making the outer ring is reduced in that no accurately finished seal surfaces need be formed. The unitary bearing and seal simplifies mounting. Since the seal pilots on the inner ring and simply floats relatively to the outer, the seal, even after compression, remains properly piloted and free running. The seal lip may, of course, be reversed when the quality of the lubricant or its probable direction of flow require.

While the invention has been described in considerable detail and preferred forms illustrated, it is to be understood that various changes may be made within the scope of the invention as defined in the claims which follow.

I claim:

1. A bearing including inner and outer bearing rings with interposed antifriction bearing members, the outer ring having a generally radial, outwardly facing shoulder, a resilient seal extending from said shoulder axially to the ends of said rings and across the space between said rings, said seal having a resilient lip surrounding said inner ring in running seal engagement therewith, and serving also to pilot said seal on said inner ring, the axial dimension of said seal initially being of a length to extend beyond the ends of said rings and fitting loosely in said outer ring, and a bearing mounting comprising an abutment compressing said seal against said shoulder and within the ends of said rings, whereby the compressed seal is in sealing engagement with said shoulder, said abutment and said inner ring.

2. In the combination defined in claim 1, said outer ring having an annular groove defining said shoulder inwardly of the outer end of said ring, said groove having a part to hold said seal axially against accidental loss from said outer ring.

3. In the combination defined in claim 1, said outer ring having an annular groove therein to loosely receive said seal, said groove at the axially inner end defining said shoulder and said groove defining a second shoulder at an axially outer part to hold said seal against axial accidental loss from said outer ring.

4. In the combination defined in claim 1, said outer ring having an annular groove therein to loosely receive said seal, said groove at the axially inner end defining said shoulder and said groove being generally cone shaped inwardly toward the axially outer end to engage said seal and prevent accidental axial loss of said seal from said ring.

5. In the combination defined in claim 1, said seal having an annular generally cylindrical insert embedded therein in the outer portion and between the resilient surfaces aforesaid, whereby to assure proper engagement of said surfaces as aforesaid upon axial compression of said seal.

6. In the combination defined in claim 5, said insert having a generally right angularly extending plate extending along a part of the outside of said seal, said insert being of generally right angle shape in cross section.

References Cited in the file of this patent

UNITED STATES PATENTS

| 1,850,068 | Ballman | Mar. 22, 1932 |
| 2,368,380 | Ruzicka | Jan. 30, 1945 |
| 2,467,049 | Peterson | Apr. 12, 1949 |
| 2,736,586 | Riesing | Feb. 28, 1956 |
| 2,755,113 | Baumheckel | July 17, 1956 |
| 2,830,858 | Moorman et al. | Apr. 15, 1958 |

FOREIGN PATENTS

| 580,871 | Great Britain | Sept. 23, 1946 |
| 669,500 | Great Britain | Apr. 2, 1952 |
| 1,059,775 | France | Nov. 18, 1953 |
| 917,942 | Germany | Sept. 16, 1954 |